(12) United States Patent
Chen et al.

(10) Patent No.: US 10,944,983 B2
(45) Date of Patent: Mar. 9, 2021

(54) METHOD OF MOTION INFORMATION CODING

(71) Applicant: MEDIATEK INC., Hsinchu (TW)

(72) Inventors: Ching-Yeh Chen, Taipei (TW); Tzu-Der Chuang, Hsinchu County (TW); Yu-Wen Huang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 107 days.

(21) Appl. No.: 15/126,355

(22) PCT Filed: Apr. 1, 2015

(86) PCT No.: PCT/CN2015/075648
§ 371 (c)(1),
(2) Date: Sep. 15, 2016

(87) PCT Pub. No.: WO2015/149698
PCT Pub. Date: Oct. 8, 2015

(65) Prior Publication Data
US 2017/0085906 A1   Mar. 23, 2017

Related U.S. Application Data

(60) Provisional application No. 61/973,403, filed on Apr. 1, 2014.

(51) Int. Cl.
*H04N 19/70* (2014.01)
*H04N 19/52* (2014.01)
(Continued)

(52) U.S. Cl.
CPC .......... *H04N 19/52* (2014.11); *H04N 19/105* (2014.11); *H04N 19/159* (2014.11); *H04N 19/56* (2014.11);
(Continued)

(58) Field of Classification Search
CPC ..... H04N 19/50; H04N 19/105; H04N 19/159
(Continued)

(56) References Cited

U.S. PATENT DOCUMENTS 9,288,501 B2   3/2016   Zheng et al.
2012/0230392 A1*  9/2012  Zheng ................. H04N 19/197
                                                              375/240.02
(Continued)

FOREIGN PATENT DOCUMENTS

CN   103155563 A   6/2013
CN   103338372 A   10/2013
(Continued)

OTHER PUBLICATIONS

Fukushima, S., et al.; "Merge based mvd transmission;" Joint Collaboration Team on Video Coding (JCT-VC) of ITU-T SG16 WP3 and ISO/IEC JTC1/5C29/WG11; Jul. 2011; pp. 1-7.
(Continued)

*Primary Examiner* — Amir Shahnami
(74) *Attorney, Agent, or Firm* — Oblon, McClelland, Maier & Neustadt, L.L.P.

(57) ABSTRACT

A method and apparatus for motion information coding not only uses the Merge index to indicate the selected Merge candidate, but also refines partial motion information of the selected Merge candidate. An encoder derives a Merge candidate set based on the motion information associated with neighboring blocks. The encoder selects a target Merge candidate from the Merge candidate set and signal a Merge index corresponding to the target Merge candidate. The encoder then predicts a part of the current motion information based on partial motion information associated with the target Merge candidate to generate coded motion information.

15 Claims, 3 Drawing Sheets

(51) Int. Cl.
*H04N 19/56* (2014.01)
*H04N 19/593* (2014.01)
*H04N 19/105* (2014.01)
*H04N 19/159* (2014.01)
*H04N 19/172* (2014.01)
*H04N 19/176* (2014.01)
*H04N 19/184* (2014.01)

(52) U.S. Cl.
CPC .......... *H04N 19/593* (2014.11); *H04N 19/70* (2014.11); *H04N 19/172* (2014.11); *H04N 19/176* (2014.11); *H04N 19/184* (2014.11)

(58) Field of Classification Search
USPC ................................................. 375/240.16
See application file for complete search history.

(56) References Cited

U.S. PATENT DOCUMENTS

| | | | | |
|---|---|---|---|---|
| 2012/0328022 | A1* | 12/2012 | Sasai | ...................... H04N 19/52 |
| | | | | 375/240.16 |
| 2013/0070855 | A1* | 3/2013 | Zheng | .................. H04N 19/105 |
| | | | | 375/240.16 |
| 2013/0170553 | A1* | 7/2013 | Chen | ...................... H04N 19/50 |
| | | | | 375/240.16 |
| 2014/0286430 | A1 | 9/2014 | Lee et al. | |

FOREIGN PATENT DOCUMENTS

| | | |
|---|---|---|
| CN | 103430540 A | 12/2013 |
| NO | 2013/070757 A1 | 5/2013 |
| NO | 2013/103879 A1 | 7/2013 |
| WO | WO 2012174990 A1 * | 12/2012 ............. H04N 19/52 |
| WO | WO-2013040994 A1 * | 3/2013 ............. H04N 19/52 |

OTHER PUBLICATIONS

Kim, C., et al.; "AHG5: Context reduction for MVD coding;" Joint Collaboration Team on Video Coding (JCT-VC) of ITU-T SG 16 WP 3 and ISO/IEC JTC 1/SC 29/WG 11; Jul. 2012; pp. 1-5.

International Search Report and Written Opinion issued in PCT/CN2015/075648 dated Jul. 1, 2015.

* cited by examiner

METHOD OF MOTION INFORMATION CODING

CROSS REFERENCE TO RELATED APPLICATIONS

The present invention claims priority to U.S. Provisional Patent Application No. 61/973,403, filed Apr. 1, 2014. The U.S. Provisional Patent Application is hereby incorporated by reference in its entirety.

TECHNICAL FIELD

The present invention relates to video coding. In particular, the present invention relates to motion information coding based on motion information associated with neighboring blocks.

BACKGROUND

In video coding systems, spatial and temporal redundancy is exploited using spatial and temporal prediction to reduce the information to be transmitted. The spatial and temporal prediction utilizes decoded pixels from the same picture and reference pictures respectively to form prediction for current pixels to be coded. In a conventional coding system, side information associated with spatial and temporal prediction may have to be transmitted, which will take up some bandwidth of the compressed video data. The transmission of motion vectors for temporal prediction may require a noticeable portion of the compressed video data, particularly in low-bitrate applications. To further reduce the bitrate associated with motion vectors, a technique called Motion Vector Prediction (MVP) has been used in the field of video coding in recent years. The MVP technique exploits the statistic redundancy among neighboring motion vectors spatially and temporally. In the rest of this document, MVP may sometimes denote "motion vector prediction" and sometimes denote "motion vector predictor" according to contexts.

In the High-Efficiency Video Coding (HEVC) standard, there are two methods to encode the motion information associated with each Inter prediction unit (PU). One is Merge mode and the other is Advanced Motion Vector Prediction (AMVP) mode. If the Merge mode is used, a Merge index is coded to indicate the Merge candidate selected for the PU from a Merge candidate set, which consists of motion information associated with neighboring blocks. The motion information of the current PU will be the same as the motion information of selected neighboring block. In other words, the current PU inherits motion information from the selected Merge candidate when the Merge mode is used. If the AMVP mode is used for the current PU, the motion information including Inter prediction direction, reference frame index, motion vector predictor index and motion vector difference are coded directly. Compared to the Merge mode, more syntax elements have to be signaled to represent the motion information in the AMVP mode. In other words, more bits are required to encode the motion information in the AMVP mode than the Merge mode. It is desirable to improve the coding efficiency related to motion information coding.

The candidates for the AMVP mode and Merge mode are derived based on the motion information of neighboring blocks. The neighboring blocks include one or more spatial neighboring blocks and temporal neighboring blocks. An example of neighboring blocks used by the HEVC standard are shown in FIG. 1, where $B_0$, $B_1$, $B_2$, $A_0$, and $A_1$ represent spatial neighboring blocks of the current block (110). $B_{CTR}$ represents a center co-located temporal neighboring block. If the motion information associated with $B_{CTR}$ is not available, temporal neighboring block $B_{BR}$ is used.

SUMMARY

A method and apparatus for motion information coding using a refined Merge mode are disclosed. Embodiments of the present invention not only uses the Merge index to indicate the selected Merge candidate, but also refines partial motion information of the selected Merge candidate.

An encoder according to the present invention will determine second motion information associated with one or more neighboring blocks of the current block and derive a Merge candidate set consisting of one or more Merge candidates based on the second motion information associated with said one or more neighboring blocks. The encoder selects a target Merge candidate from the Merge candidate set and signal a Merge index corresponding to the target Merge candidate. The encoder then predicts a first part of the current motion information based on partial second motion information associated with the target Merge candidate to generate coded motion information. The encoder signals the coded motion information for the current motion information without other coded information corresponding to remaining part of the current motion information.

A decoder according to the present invention will derive a Merge candidate set consisting of one or more Merge candidates based on the second motion information associated with said one or more neighboring blocks. The decoder will determine a target Merge candidate from the Merge candidate set based on a Merge index signaled in the bitstream. The decoder determines a first part of current motion information based on coded motion information signaled in the bitstream. The remaining part of the current motion information will be inherited from the second motion information associated with the target Merge candidate.

The coded motion information may correspond to Inter prediction direction associated with the target Merge candidate, reference frame index associated with the target Merge candidate, one or more second motion vectors associated with the target Merge candidate, one or more motion vector differences between one or more current motion vectors of the current block and said one or more second motion vectors, or any combination. In one embodiment, the coded motion information corresponds to one or more motion vector differences between one or more current motion vectors of the current block and said one or more second motion vectors. The remaining part of the current motion information inherited from the second motion information associated with the target Merge candidate may correspond to Inter prediction direction, reference frame index and a second motion vector.

DETAILED DESCRIPTION

Figure 1:
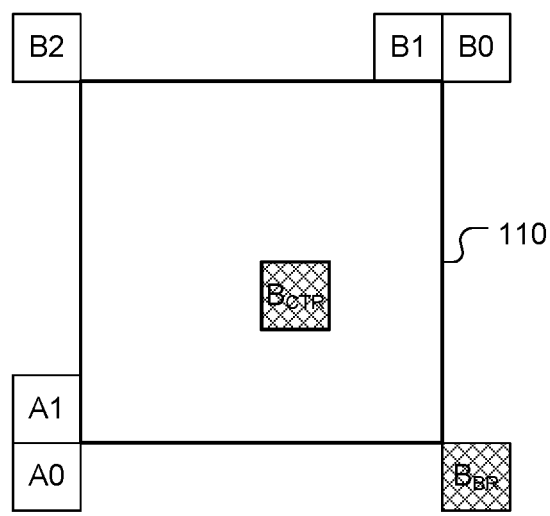
FIG. 1 illustrates neighboring block configuration for the Advanced Motion Vector Prediction (AMVP) mode and Merge modes according to High Efficient Video Coding.

As mentioned before, among the two motion information coding modes used in the High Efficiency Video Coding (HEVC) standard, AMVP can provide high quality representation of the motion information at the expense of more bits. On the other hand, the Merge mode uses a compact representation that only needs to signal the candidate index to recover the motion information. However, the motion information including Inter prediction direction, reference picture list and motion vector, is restricted to be the same as that of a selected Merge candidate. The present invention discloses a method that utilizes the compact representation of the conventional Merge mode and also refines the motion information quality of the conventional Merge mode. The refinement is achieved by transmitting coded motion information related to partial motion information of the selected merge candidate, such as the motion vector difference (MVD) between the current motion vector and the motion vector of the selected Merge candidate.

It has been observed that, in Inter prediction, most of prediction units (PUs) are coded in the Merge mode, and only a few prediction units are coded in the AMVP mode. In other words, Merge mode is more preferred than the AMVP mode in Inter prediction due to its high coding efficiency. In order to reduce the bits for coding motion information, the present invention utilizes the Merge candidate in Merge mode as a predictor of motion information. This mode is referred as Merge refinement mode or refined Merge mode in this disclosure. In the Merge refinement mode, one Merge index is coded to indicate which Merge candidate is selected as the predictor of motion information. Coded motion information, such as the motion vector difference between the current motion vector and the motion vector of the selected Merge candidate is transmitted. For the Merge refinement mode, Inter prediction direction and reference frame index of the current PU can be set to the same as those of merged motion information. On the other hand, for the AMVP mode, Inter prediction direction and reference frame index of current PU are also transmitted. The Merge refinement mode requires fewer bits than the AMVP mode.

In one embodiment of the Merge refinement mode, the motion vector of the selected Merge candidate as indicated by the Merge index is used as the motion vector predictor for the current PU. The prediction residue, i.e., the motion vector difference is transmitted. The motion vector for the PU can be reconstructed from the sum of motion vector predictor and motion vector difference. Other than the Merge index, only the motion vector difference is coded to refine the merged motion vector. The reconstructed motion vector can be derived as the sum of the motion vector difference transmitted and the motion vector of the selected merge candidate. Inter prediction direction, reference frame index, and motion vector predictor index are directly inherited from those indicated by the Merge index. Therefore, the Merge refinement mode requires fewer transmitted bits than the AMVP mode. On the other hand, the Merge refinement mode results in more accurate motion information representation than the convention Merge mode.

While the coded motion information corresponds to the motion vector difference between the current motion vector and the motion vector of the selected Merge candidate, other motion information can be coded as well. For example, the coded motion information may correspond to Inter prediction direction associated with the selected Merge candidate, reference frame index associated with the selected Merge candidate, one or more second motion vectors associated with the selected Merge candidate, one or more motion vector differences between ore current motion vector(s) of the current block and s motion vector(s) of the selected Merge candidate, or any combination thereof.

In the parsing stage of the Merge refinement mode, only the Merge index is decoded. There is no information regarding whether the Inter prediction direction of the merged motion vector is bi-prediction or uni-prediction. In order to avoid parsing issue, two embodiments are disclosed. In the first embodiment, only one motion vector difference is coded in the Merge refinement mode even if the merged motion vector is bi-prediction. The motion vector difference is used to refine the existing motion vector in the uni-prediction or to refine the pre-defined motion vector in the bi-prediction. In the Merge refinement mode, the motion vector difference should not be zero. Otherwise, the motion information of the PU would have been coded using the Merge mode. An embodiment utilizes this characteristic to further save the coded bins by excluding the zero-valued motion vector difference in a coding table. For example, if the x-component magnitude, $MVD_x$ of the motion vector difference is 0, then the y-component magnitude, $MVD_y$ of the motion vector difference cannot be zero. To take advantage of this characteristics, $(MVD_y-1)$ can be coded instead of $MVD_y$, and the range of the y-component magnitude is reduced by 1.

Table 1 shows an example of the syntax structure according to an embodiment of the present invention. As shown in Table 1, when a Merge mode flag, mergeFlag is not asserted, a Merge refinement mode flag, mergeRefinedFlag is included. If the Merge refinement mode flag is asserted, the Merge index, mergeIdx for the selected Merge candidate and the motion vector difference, Mvd are included

TABLE 1

```
prediction unit( ) {
   ......
   mergeFlag
   if( mergeFlag ){   // Merge Mode
      mergeIdx
   }
   else {
      mergeRefinedFlag
      if ( mergeRefinedFlag ) {   // Proposed Merge Refinement Mode
         mergeIdx
         Mvd
      }
      else {   // AMVP mode
         interPredDir
         ... ...
         ...
      }
   }
}
```

In another embodiment, a second flag is used to indicate whether there is another coded motion vector difference in the bitstream. According to this embodiment, two motion vectors in bi-prediction can be refined simultaneously.

Figure 2:
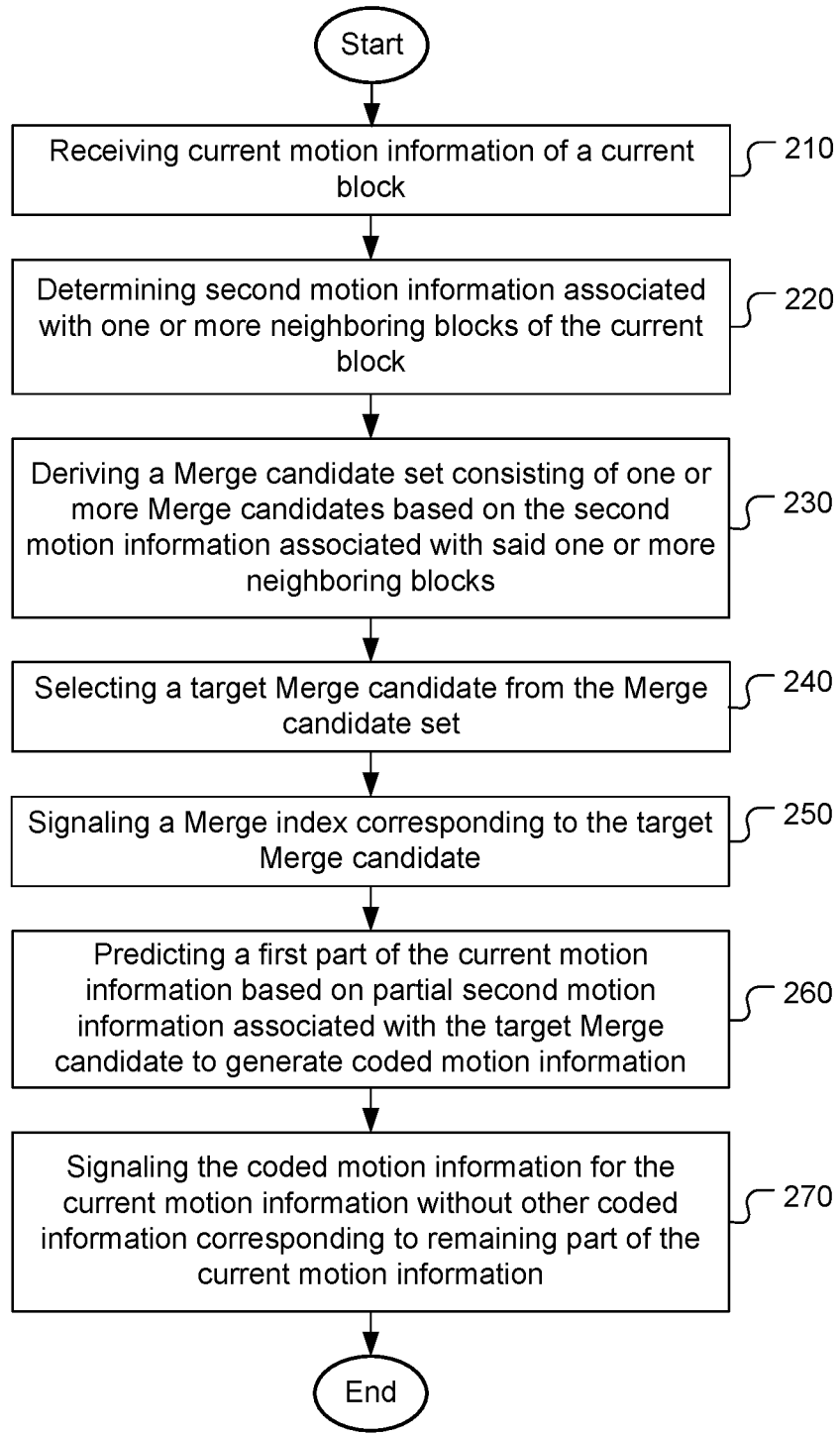
FIG. 2 illustrates an exemplary flowchart of an encoder incorporating refined Merge mode for motion information coding according to one embodiment of the present invention.

FIG. 2 illustrates an exemplary flowchart of an encoder incorporating refined Merge mode for motion information coding according to one embodiment of the present invention. The encoder receives current motion information of a current block as shown in step 210. The current motion information may be retrieved from memory (e.g., computer memory, buffer (RAM or DRAM) or other media) or from a processor. The encoder then determines second motion information associated with one or more neighboring blocks of the current block in step 220. A Merge candidate set consisting of one or more Merge candidates is derived based on the second motion information associated with said one or more neighboring blocks in step 230. The encoder selects a target Merge candidate from the Merge candidate set in step 240 and signals the Merge index corresponding to the target Merge candidate in step 250. A first part of the current motion information is predicted based on partial second motion information to generate coded motion information in step 260. The coded motion information for the current motion information is signaled without other coded information corresponding to remaining part of the current motion information in step 270.

Figure 3:
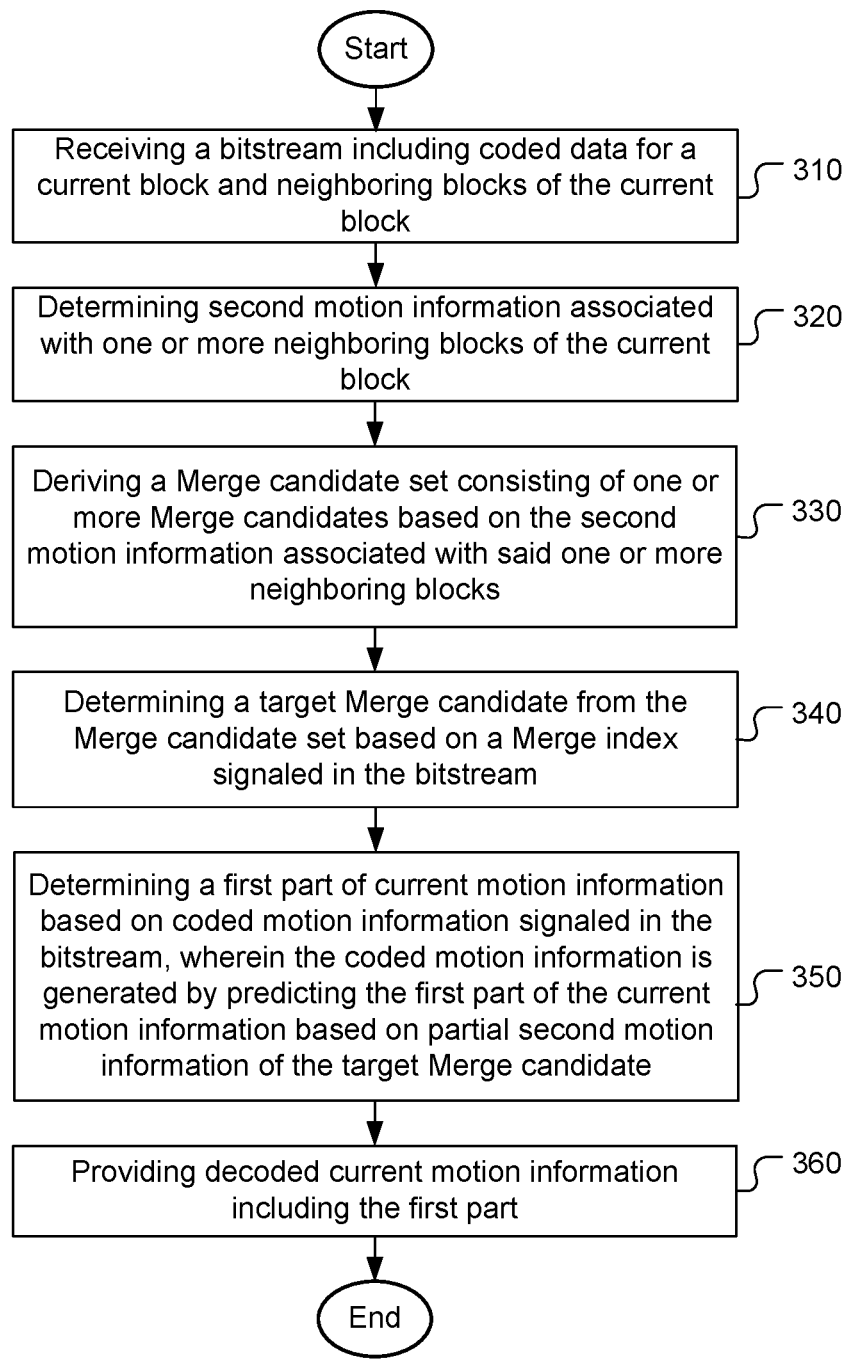
FIG. 3 illustrates an exemplary flowchart of a decoder incorporating refined Merge mode for motion information coding according to one embodiment of the present invention.

FIG. 3 illustrates an exemplary flowchart of a decoder incorporating refined Merge mode for motion information coding according to one embodiment of the present invention. The decoder receives a bitstream including coded data for a current block and neighboring blocks of the current block in step 310. The bitstream may be retrieved from memory (e.g., computer memory, buffer (RAM or DRAM) or other media) or from a processor. The decoder also receives second motion information associated with said one or more neighboring blocks of the current block in step 320. A Merge candidate set consisting of one or more Merge candidates is derived based on the second motion information associated with said one or more neighboring blocks in step 330. The decoder determines a target Merge candidate from the Merge candidate set based on a Merge index signaled in the bitstream in step 340. A first part of current motion information is determined based on coded motion information signaled in the bitstream as shown in step 350. The coded motion information is generated by predicting the first part of the current motion information based on partial second motion information associated with the target Merge candidate. The coded motion information for the current motion information is signaled without other coded information corresponding to remaining part of the current motion information in step 360.

The flowcharts shown above are intended to illustrate an example of motion information coding according to embodiments of the present invention. A person skilled in the art may modify each step, re-arranges the steps, split a step, or combine steps to practice the present invention without departing from the spirit of the present invention.

As shown above, Merge mode motion refinement is used to illustrate an example of explicitly coding partial motion information from a neighboring block and inheriting the remaining motion information. However, the present invention is not restricted to Merge refinement mode, where the motion vector difference (MVD) is explicitly coded and the remaining motion information is inherited from the selected merge candidate. For example, instead of coding all motion information associated with an AMVP mode (i.e., Inter mode), partial motion information may be inherited from a neighboring block.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention may correspond to one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for motion information decoding, the method comprising:
   receiving a bitstream including coded data for a current block and one or more neighboring blocks of the current block;
   determining motion information associated with the one or more neighboring blocks of the current block;
   deriving a Merge candidate set that includes one or more Merge candidates based on the motion information associated with the one or more neighboring blocks;
   determining a target Merge candidate from the Merge candidate set based on a Merge index included in coded motion information that is signaled in the bitstream; and
   decoding current motion information for decoding the current block, including determining a first part of the current motion information for the current block based on at least a portion of motion information associated with the target Merge candidate and at least one motion vector difference,
   wherein
      the at least one motion vector difference includes an x-component and a y-component,
      the at least one motion vector difference is encoded and included in the coded motion information, and
      the coded motion information is arranged according to a syntax structure that, when the at least one motion vector difference exists, includes a case where the x-component or the y-component of the at least one motion vector difference is non-zero and excludes a case where the x-component and the y-component of the at least one motion vector difference are both zero.

2. The method of claim 1, wherein the coded motion information further specifies an Inter prediction direction associated with the target Merge candidate, a reference frame index associated with the target Merge candidate, one or more motion vectors associated with the target Merge candidate, or any combination thereof.

3. The method of claim 2, wherein the coded motion information specifies one or more motion vector differences between one or more current motion vectors for the current block and the one or more motion vectors associated with the target Merge candidate.

4. The method of claim 3, wherein, when the current block is coded according to a uni-prediction mode, the one or more motion vector differences correspond to a single motion vector difference and the single motion vector difference is used to refine one of the one or more motion vectors associated with the target Merge candidate in a corresponding reference picture list.

5. The method of claim 3, wherein, when the current block is coded according to a bi-prediction mode and the one or more motion vector differences correspond to a single motion vector difference, the single motion vector difference is used to refine one of the one or more motion vectors associated with the target Merge candidate in a pre-defined list.

6. The method of claim 1, wherein the current motion information includes the first part of the current motion information and a remaining part of the current motion information.

7. The method of claim 6, wherein the remaining part of the current motion information further specifies a second motion vector.

8. The method of claim 7, wherein the remaining part of the current motion information is inherited from the motion information associated with the target Merge candidate, and specifies at least an Inter prediction direction, a reference frame index, and the second motion vector.

9. A method for motion information encoding, the method comprising:
obtaining current motion information for encoding a current block;
determining motion information associated with one or more neighboring blocks of the current block;
deriving a Merge candidate set that includes one or more Merge candidates based on the motion information associated with the one or more neighboring blocks;
selecting a target Merge candidate from the Merge candidate set;
encoding a Merge index corresponding to the target Merge candidate to be signaled via a bitstream; and
generating coded motion information to be signaled via the bitstream, wherein
the coded motion information indicates predicting a first part of the current motion information based on at least a portion of motion information associated with the target Merge candidate and at least one motion vector difference,
the coded motion information specifies the at least one motion vector difference that includes an x-component and a y-component, and
the coded motion information is arranged according to a syntax structure that, when the at least one motion vector difference exists, includes a case where the x-component or the y-component of the at least one motion vector difference is non-zero and excludes a case where the x-component and the y-component of the at least one motion vector difference are both zero.

10. The method of claim 9, wherein the coded motion information further specifies an Inter prediction direction associated with the target Merge candidate, a reference frame index associated with the target Merge candidate, the one or more motion vectors associated with the target Merge candidate, or any combination thereof.

11. The method of claim 10, wherein the coded motion information specifies one or more motion vector differences between one or more current motion vectors for the current block and the one or more motion vectors associated with the target Merge candidate.

12. The method of claim 11, wherein, when the current block is coded according to a uni-prediction mode, the one or more motion vector differences correspond to a single motion vector difference and the single motion vector difference is used to refine one of the one or more motion vectors associated with the target Merge candidate in a corresponding reference picture list.

13. The method of claim 11, wherein, when the current block is coded according to a bi-prediction mode and the one or more motion vector differences correspond to a single motion vector difference, the single motion vector difference is used to refine one of the one or more motion vectors associated with the target Merge candidate in a pre-defined list.

14. The method of claim 9, wherein
the current motion information includes the first part of the current motion information and a remaining part of the current motion information, and
the remaining part of the current motion information further specifies a second motion vector.

15. An apparatus, comprising:
one or more processors configured to execute a program code to:
receive a bitstream including coded data for a current block and one or more neighboring blocks of the current block;
determine motion information associated with the one or more neighboring blocks of the current block;
derive a Merge candidate set that includes one or more Merge candidates based on the motion information associated with the one or more neighboring blocks;
determine a target Merge candidate from the Merge candidate set based on a Merge index included in coded motion information that is signaled in the bitstream; and
decode current motion information for decoding the current block, including determining a first part of the current motion information for the current block based on at least a portion of motion information associated with the target Merge candidate and at least one motion vector difference,
wherein
the at least one motion vector difference includes an x-component and a y-component,
the at least one motion vector difference is encoded and included in the coded motion information, and
the coded motion information is arranged according to a syntax structure that, when the at least one motion vector difference exists, includes a case where the x-component or the y-component of the at least one motion vector difference is non-zero and excludes a case where the x-component and they-component of the at least one motion vector difference are both zero.

\* \* \* \* \*